United States Patent [19]

Miyamoto et al.

[11] Patent Number: 5,521,041
[45] Date of Patent: May 28, 1996

[54] POLYCARBONATE, METHOD OF PREPARING THE SAME AND ELECTROPHOTOGRAPHIC PHOTORECEPTOR PRODUCED BY USING THE SAME

[75] Inventors: Hideyuki Miyamoto; Shuji Sakamoto; Hironobu Morishita; Tomohiro Nagao, all of Sodegaura, Japan

[73] Assignee: Idemitsu Kosan Co., Ltd., Tokyo, Japan

[21] Appl. No.: 133,126

[22] PCT Filed: Mar. 3, 1993

[86] PCT No.: PCT/JP93/00267

§ 371 Date: Oct. 13, 1993

§ 102(e) Date: Oct. 13, 1993

[87] PCT Pub. No.: WO93/18081

PCT Pub. Date: Sep. 16, 1993

[30] Foreign Application Priority Data

Mar. 3, 1992 [JP] Japan .................. 4-080226
Oct. 20, 1992 [JP] Japan .................. 4-306284

[51] Int. Cl.⁶ .............. G03G 15/02; G03G 5/00; C08G 64/14
[52] U.S. Cl. .............. 430/58; 430/96; 528/202
[58] Field of Search ................ 430/58, 59, 96; 528/202

[56] References Cited

U.S. PATENT DOCUMENTS

| | | | |
|---|---|---|---|
| Re. 27,682 | 6/1973 | Schnell et al. ............... | 528/204 X |
| 3,036,040 | 5/1962 | Lee et al. | |
| 5,213,924 | 5/1993 | Sakamoto ....................... | 430/58 |

FOREIGN PATENT DOCUMENTS

| | | | |
|---|---|---|---|
| 4103530 | 8/1992 | Germany ....................... | 528/202 |
| 64-74220 | 3/1989 | Japan . | |

OTHER PUBLICATIONS

English Translation of European Patent 4,103,530 Fennhoff et al. Aug. 13, 1992.

*Primary Examiner*—George F. Lesmes
*Assistant Examiner*—Bernard P. Codd
*Attorney, Agent, or Firm*—Antonelli, Terry, Stout & Kraus

[57] ABSTRACT

A polycarbonate and a method of preparing the polycarbonate which comprises a repeating unit represented by the following general formula

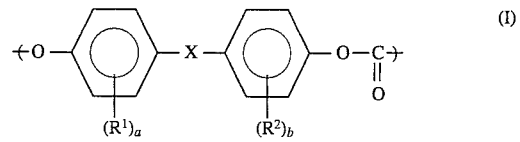

wherein each of $R^1$ and $R^2$ respectively is a halogen atom, an alkyl group, a cycloalkyl group or an aryl group, each of a and b is an integer of 0 to 4, and X is a single bond, —O—, —CO—, —S—, —SO—, —SO$_2$—, —CR$^3$R$^4$—, a 1,1-cycloalkylidene group or an α,ω-alkylene group, and end groups represented by the following general formulas $$R^5-Y_e- \quad \text{(II)}$$

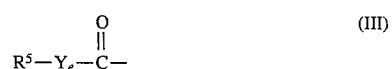

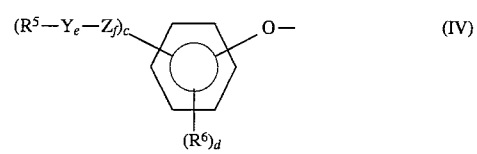

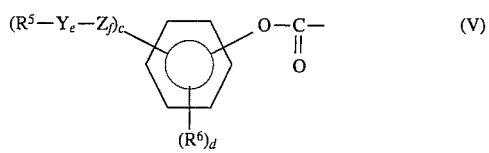

wherein, $R^5$ is a perfluoroalkyl group or substituted perfluoroalkyl group of 1 to 30 carbon atoms, Y is —CH$_2$—, e is an integer of 0 to 6, Z is —O—, —CO—, —OCO—, —S—, —SO—, —SO$_2$— or —NHCO—, f is 0 or 1, $R^6$ is a halogen atom, an alkyl group, a cycloalkyl group or an aryl group, and each of c and d is an integer satisfying c+d≦5, c=1 to 5 and d=0 to 4, and an electrophotographic photoreceptor the photosensitive layer of which contains the polycarbonate of the specific structure as a component. The electrophotographic photoreceptor is produced by using a coating liquid which contains the polycarbonate and does not get cloudy (gel), and is practically useful since it maintains excellent mechanical strength, such as high plate wear, and excellent electrophotographic properties for a long period.

8 Claims, No Drawings

POLYCARBONATE, METHOD OF PREPARING THE SAME AND ELECTROPHOTOGRAPHIC PHOTORECEPTOR PRODUCED BY USING THE SAME

TECHNICAL FIELD

The present invention relates to a novel polycarbonate, a method of preparing the polycarbonate and an electrophotographic photoreceptor produced by using the polycarbonate. More specifically, the present invention relates to an electrophotographic photoreceptor which maintains outstanding mechanical strength, such as high surface hardness, and excellent electrophotographic properties for a long period and is useful in various application fields of electrophotography.

BACKGROUND ART

Polycarbonates have been used as materials in various fields, and as their application fields have become wider, there has arisen a demand for the development of polycarbonates having improved properties.

The electrophotographic photoreceptors that have recently been proposed and used include (1) layered-type organic electrophotographic photoreceptors, the photosensitive layers of which contain at least two layers, namely a charge generation layer for generating charge by exposure and a charge transport layer for transporting the charge, and (2) single-layer-type electrophotographic photoreceptors, the photosensitive layers of which are single layers where charge generating materials and charge transporting materials are dispersed in resins. As the resins contained in the charge transport layer of the layered-type electrophotographic photoreceptors and in the photosensitive layer of the single-layer-type electrophotographic photoreceptors, polycarbonate resins prepared from bisphenol-A have been widely used.

Since polycarbonate resins prepared from bisphenol-A have good compatibility with charge transporting materials, photoreceptors whose photosensitive layer contains such polycarbonate resins are characterized by their good electrical properties and their relatively high mechanical strength.

However, the photoreceptors produced by using the polycarbonate resins prepared from bisphenol-A have been found to involve some problems, including the following problems (1) and (2).

(1) In the production of such photoreceptors, their photosensitive layers are formed by applying a coating liquid dissolved in a solvent, and some solvents make the coating liquid get cloudy (to gel) or make the photosensitive layer crystallize easily. This causes quality defects of developed images since photo-induced discharge hardly occurs on the crystallized regions, leaving residual charges which cause an undesirable electric potential on the regions.

(2) In the case of general negatively-charged-type electrophotographic photoreceptors, their photosensitive layer formed by using the polycarbonate resins derived from bisphenol-A tends to be peeled off from their base layer due to poor adhesion to the base layer, or is worn or scored for lack of surface hardness, thereby shortening plate wear life. Herein, the base layer generally indicates the charge generation layer of layered-type photoreceptors, or the electroconductive substrate of single-layer-type photoreceptors.

DISCLOSURE OF INVENTION

An object of the present invention is to solve the problems involved in the conventional electrophotographic photoreceptors produced by using the polycarbonate resins derived from bisphenol-A and to provide a practically advantageous electrophotographic photoreceptor which can be produced without the clouding (gelatin) of the coating liquid and maintains excellent mechanical strength, such as good plate wear, and good electrophotographic properties for a long period.

Another object of the present invention is to provide a novel and functionally excellent polycarbonate of a novel structure and a method of preparing the same which is a suitable component for the photosensitive layer of the above-described electrophotographic photoreceptor and is also useful as an EL (electroluminescent) material.

The inventors studied to solve the problems, and they consequently found that an electrophotographic photoreceptor, the photosensitive layer of which contained a polycarbonate structurally characterized by its fluorine-containing end groups, could overcome the above problems of the conventional ones produced by using the bisphenol-A polycarbonates, was free from the clouding (gelatin) of the coating liquid during its production and maintained excellent mechanical strength and good electrophotographic properties for a long period. On the basis of the finding, the inventors have completed tile present invention.

That is, the present invention provides a polycarbonate comprising a repeating unit represented by the following general formula

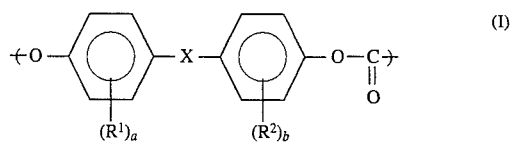
(I)

wherein each of $R^1$ and $R^2$ respectively is a halogen atom, an alkyl group of 1 to 6 carbon atoms, a cycloalkyl group of 5 to 7 carbon atoms or a substituted or unsubstituted aryl group of 6 to 12 carbon atoms, each of a and b respectively is an integer of 0 to 4, and X is a single bond, —O—, —CO—, —S—, —SO—, —SO$_2$—, —CR$^3$R$^4$— (each of $R^3$ and $R^4$ respectively is hydrogen atom, trifluoromethyl group, an alkyl group of 1 to 6 carbon atoms or a substituted or unsubstituted aryl group of 6 to 12 carbon atoms), a 1,1-cycloalkylidene group of 5 to 11 carbon atoms or an α,ω-alkylene group of 2 to 12 carbon atoms, and end groups selected from the group consisting of the groups represented by the following general formulas

(II)

(III)

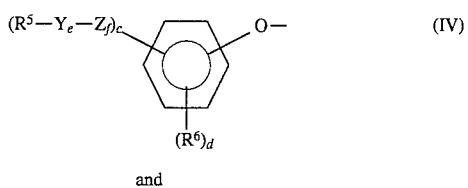
(IV)

and

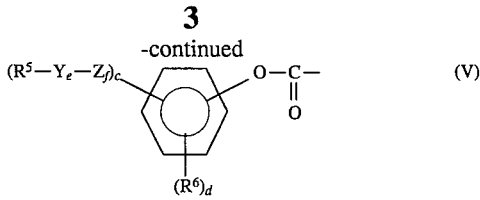

wherein, in formulas (II) to (V), $R^5$ is a perfluoroalkyl group or substituted perfluoroalkyl group of 1 to 30 carbon atoms, Y is —$CH_2$—, e is an integer of 0 to 6, Z is —O—, —CO—, —OCO—, —S—, —SO—, —$SO_2$— or —NHCO—, f is an integer of 0 or 1, $R^6$ is a halogen atom, an alkyl group of 1 to 6 carbon atoms, a cycloalkyl group of 5 to 7 carbon atoms or a substituted or unsubstituted aryl group of 6 to 12 carboil atoms, and each of c and d is an integer satisfying $c+d \leq 5$, $c=1$ to 5 and $d=0$ to 4, and having a reduced viscosity of 0.1 to 2.5 dl/g, measured at 20° C. as a solution of a concentration of 0.5 g/dl dissolved in methylene chloride.

The present invention further provides a suitable method of preparing the above polycarbonate, which comprises allowing a dihydric phenol represented by the following general formula

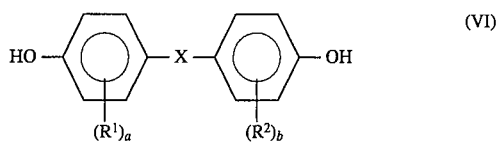

wherein, $R^1$, $R^2$, a, b and X are as defined above to react with a carbonate precursor in the presence of an end terminator represented by the following general formula $R^5-Y_e-COOH$, $R^5-Y_e-COX^1$ or

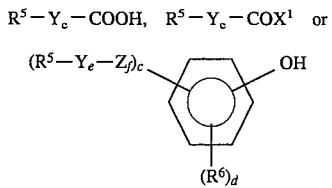

wherein, $R^5$, Y, e, Z, f, $R^6$, c and d are as defined above, and $X^1$ is a halogen atom.

The present invention further provides an electrophotographic photoreceptor comprising an electroconductive substrate and a photosensitive layer disposed on a surface of the electroconductive substrate, the photosensitive layer containing the polycarbonate of the present invention.

BEST MODE FOR CARRYING OUT THE INVENTION

The polycarbonate to be used in the present invention may contain repeating units other than the above-described repeating units and may mixed with other polycarbonates or additives as far as the object of the present invention is sufficiently attained.

The polycarbonate to be used in the present invention has a reduced viscosity of 0.1 to 2.5 dl/g, measured at 20° C. as a solution of a concentration of 0.5 g/dl dissolved in methylene chloride. If the reduced viscosity is less than 0.1 dl/g, the polycarbonate may have poor mechanical strength, and particularly, layers containing such a polycarbonate as a component may have insufficient surface hardness, causing the wear of photoreceptors during printing and shortening the life of the photoreceptors. If the reduced viscosity is more than 2.5 dl/g, the polycarbonate may have such a high solution viscosity as to make the preparation of photoreceptors by solution-coating difficult.

The method of preparing the polycarbonate of the present invention is not particularly limited, and a suitable method is the method of the present invention which comprises allowing the dihydric phenol represented by the general formula (VI) to react with the above-described carbonate precursor in the presence of the above-described end terminator.

The reaction is carried out by a polycondensation wherein, in the presence of an acid acceptor wherein a carbonyl dihalide, such as phosgene, a haloformate, such as a chloroformate, or a carbonic acid ester is used as the carbonate precursor, or by a transesterification wherein a bisaryl carbonate is used as the carbonate precursor.

Some examples of the dihydric phenol represented by the general formula (VI) include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, bis(4-hydroxyphenyl)ether, bis(4-hydroxyphenyl)ketone, bis(4-hydroxyphenyl)sulfide, bis(4-hydroxyphenyl)sulfone, 1,1bis( 4-hydroxyphenyl)cyclopentane, 1,1-bis(4-hydroxyphenyl)cyclohexane, 2,2-bis(3-methyl-4 hydroxyphenyl)propane, 2-(3-methyl-4-hydroxyphenyl)-2-(4 -hydroxyphenyl)-1-phenylethane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-buthyl-4-hydroxy-5-methylphenyl)heptane, 1,1-bis(2-tert-butyl-4-hydroxy-5 -methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 1,1-bis(3-cyclohexyl-4-hydroxyphenyl)cyclohexane, 4,4'-dihydroxybiphenyl, 4,4'-dihydroxy-3,3'-dimethylbiphenyl, 4,4'-dihydroxy-2,2'-dimethylbiphenyl, 4,4'-dihydroxy-3,3'-dicyclohexylbiphenyl, 3,3'-difluoro-4,4'-dihydroxybiphenyl, 2,2-bis(4-hydroxyphenyl)hexafluoropropane, 2,2-bis(3-phenyl-4-hydroxyphenyl)propane, 1,1-bis(3-phenyl-4 hydroxyphenyl)cyclohexane, 4,4'-dihydroxybenzophenone and bis(3-phenyl-4-hydroxyphenyl)sulfone. These dihydric phenols may be used individually or in a combination of two or more of them.

Among these, preferred examples include 2,2-bis( 4-hydroxyphenyl)propane, 1,1-bis(4-hydroxyphenyl)cyclohexane, 1,1-bis(4-hydroxyphenyl)-1,1-diphenylmethane, 1,1-bis(4-hydroxyphenyl)-1-phenylethane, bis(4-hydroxyphenyl)sulfone, 2,2-bis(3-methyl-4- hydroxyphenyl)propane, 4,4'-dihydroxybiphenyl and 2,2-bis(3-phenyl-4-hydroxyphenyl)propane.

In the formula which represents the end terminator being to be used in the method of preparing the polycarbonate of the present invention and containing fluorine atoms, $R^5$ and $R^6$ are substituted or unsubstituted perfluoroalkyl groups of 1 to 30 carbon atoms, which may be linear, branched or alicyclic. Preferred examples are perfluoroalkyl groups of 1 to 20 carbon atoms.

Some examples of the substituted perfluoroalkyl groups include those represented by the following formulas:

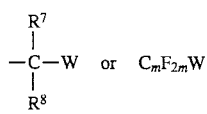

wherein, each of $R^7$ and $R^8$ respectively is a perfluoroalkyl group or a hydrogen-substituted perfluoroalkyl group of 1 to 12 carbon atoms, W is hydrogen atom, a halogen atom other than fluorine atom, an alkyl, haloalkyl, alkoxyl or haloalkoxyl group of 1 to 20 carbon atoms, a cycloalkyl group of 5 to 7 carbon atoms or an aryl, alkyl-substituted aryl or halogen-substituted aryl group of 6 to 12 carbon atoms.

Some illustrative examples of the end terminator include perfluoroheptanoic acid, perfluorooctanoic acid, perfluorononanoic acid, 2H,2H-perfluorononanoic acid, perfluorodecanoic acid, 2H,2H,3H,3H-perfluorodecanoic acid, perfluoroundecanoic acid, perfluorododecanoic acid, perfluorotridecanoic acid, perfluorotetradecanoic acid, perfluoropentadecanoic acid, perfluorohexadecanoic acid, perfluorooctadecaonoic acid, acid halides derived from these carboxylic acids, p-(perfluorononyl)phenol, p-(perfluorohexyloxy)phenol, p-(perfluorobutyl)phenol, 4-(perfluorodecyl)-2,3,5,6-tetrafluorophenol, 3-methyl-4-(perfluorononyl)phenol, p-(2-1H,1H-perfluorotridecyloxy- 1,1,1,3,3,3-hexafluoro-2-propyl)phenol, 3,5-bis(perfluorohexyloxycarbonyl)phenol, p-1H,1H-perfluorooctyloxyphenol, perfluorododecyl p-hydroxybenzoate, (p-hydroxybenzyl)perfluorodecane and 2H,2H,9H-perfluorononanoic acid.

Among these, preferred examples are p-(perfluoro-n-nonyl)phenol, p-(perfluoro-n-hexyloxy)phenol, p-(perfluoro-tert-butyl)phenol, perfluoro-n-dodecyl p-hydroxybenzoate, 1-(p-hydroxybenzyl)perfluoro-n-decane, p-(2-1H,1H-perfluorotridecyloxy-1,1,1,3,3,3-hexafluoro-2-propyl)phenol, 3,5-bis(-perfluorohexyloxycarbonyl)phenol, p-1H,1H-perfluorooctyloxyphenol and 2H,2H,9H-perfluorononanoic acid.

The above-described reaction, wherein the polycondensation is carried out in the presence of an acid acceptor by using as the carbonate precursor a carbonyl dihalide, haloformate or carbonic acid ester, is carried out generally in a solvent.

The ratio of the carbonate precursor used may be selected properly in consideration of the stoichiometric ratios (equivalents) for the reaction. When a gaseous carbonate precursor, such as phosgene, is used, it is preferable to blow it through the reaction mass.

Some examples of the acid acceptor include alkali metal hydroxides, such as sodium hydroxide and potassium hydroxide, alkali metal carbonates, such as sodium carbonate and potassium carbonate, organic bases, such as pyridine, and mixtures thereof.

The ratio of the acid acceptor used may also be selected properly in consideration of the stoichiometric ratios (equivalents) for the reaction. It is preferable to use two equivalents or slightly more of an acid acceptor per mole (one mole generally corresponds to two equivalents) of the dihydric phenol (VI) used.

As the solvent, various solvents, including those commonly used for the preparation of known polycarbonates, may be used individually or as a solvent mixture. Typical examples include hydrocarbon solvents, such as xylene, and hydrocarbon halide solvents, such as methylene chloride and chlorobenzene. An interfacial polymerization may be carried out by using two solvents insoluble in each other.

It is desirable to accelerate the polycondensation by adding a catalyst, for example, a tertiary amine, such as trimethylamine, or a quarternary ammonium salt. If desired, a small amount of an antioxidant, such as sodium sulfite and hydrosulfide may also be added. The reaction is carried out generally at a temperature of 0° to 150° C., preferably 5° to 40° C. The reaction may be carried out under reduced pressure, at atmospheric pressure or under increased pressure, and, generally proceeds easily at atmospheric pressure or in a sealed reaction system. The reaction time depends on other reaction conditions, such as reaction temperature, and is generally 0.5 minutes to 10 hours, preferably about one minutes to two hours.

A two-stage method also may be employed, wherein first a part of the dihydric phenol (VI) and the carbonate precursor are allowed to react to form an oligomer, and the residual dihydric phenol (VI) and the end terminator containing fluorine atoms are added to complete the polycondensation. According to the two-stage method, the reaction can be easily controlled to adjust molecular weight very accurately.

Some examples of the bisaryl carbonate, which is used for the latter transesterification of the dihydric phenol (VI) and the bisaryl carbonate, include di-p-tolyl carbonate, phenyl-p-tolyl carbonate, di-p-chlorophenyl carbonate and dinaphthyl carbonate. Some examples of the reaction systems suitable for this method include a fusion cook polycondensation and solid-phase polycondensation. In the fusion cook polycondensation, the two kinds of monomers and the end terminator containing fluorine atoms are mixed with each other, and are then allowed to react under reduced pressure at a high temperature in a molten state. The reaction is carried out generally at 150° to 350° C., preferably 200° to 300°C. In the solid-phase polycondensation, the two kinds of monomers and the end terminator are mixed with each other, and polycondensation is carried out by heating the reaction mass to a temperature not higher than the melting point of the objective polycarbonate, with the solid phase maintained. In either case, the reaction pressure is reduced preferably to 1 mmHg or lower at the last stage of the reaction, to distill away the phenol that is derived from the bisaryl carbonate by the transesterification from the reaction mass. The reaction time depends on other reaction conditions, such as the reaction temperature and the reaction pressure, and is generally about one to four hours. The reaction is preferably carried out in the atmosphere of an inert gas, such as nitrogen or argon, and, if desired, in the presence of other additives, such as the above-described antioxidant.

The reduced viscosity $[\eta_{sp}/c]$ of the resulting polycarbonate can be adjusted to the above-described range by various means, for example, by selecting the above-described reaction conditions or by varying the amount of the end terminator used. According to circumstances, the obtained polycarbonate may be subjected to mechanical treatments, such as mixing or fractionation, and/or chemical treatments, such as polymer reactions, crosslinking or partial decomposition, to obtain a polycarbonate having a predetermined reduced viscosity [η $_{sp}$/c].

The obtained reaction product (crude product) may be subjected to various after-treatments, including known separation or purification methods, to obtain a polycarbonate of a desired purity.

When a dihydric phenol having an asymmetric molecule structure is used, the orientation of the resulting polycarbonate may be uniaxial or random depending on the polymerization method employed. The polycarbonate of the present invention may be of either orientation.

Also, the polycarbonate of the present invention may be linear, branched or cyclic. Some examples of branching monomers which may be used in the present invention include polyhydroxy compounds, such as phloroglucinol, 2,6-dimethyl-2,4,6-tris(4-hydroxyphenyl)heptene-3, 4,6-dimethyl-2,4,6-tris(4-hydroxyphenyl)heptene-2, 1,3,5-tris(2-hydroxyphenyl)benzol, 1,1,1-tris(4-hydroxyphenyl)ethane, 2,6-bis(2-hydroxy-5-methylbenzyl)-4-methylphenol and α,α',α" -tris(4-hydroxyphenyl)-1,3,5-triisopropylbenzene, 3,3-bis(4-hydroxyaryl)oxyindole [=isatin bisphenol], 5-chloroisatin, 5,7-dichloroisatin and 5-bromoisatin. Among these, particularly preferred is 1,1,1-tris(4-hydroxyphenyl)ethane.

The electrophotographic photoreceptor of the present invention comprises an electroconductive substrate and a photosensitive layer disposed thereon, and it is characterized in that the polycarbonate of the present invention is used as a component of the photosensitive layer.

The electrophotographic photoreceptor of the present invention may be of any structure, including those of known various electrophotographic photoreceptors, so far as the polycarbonate of the present invention is used as a component in a single-layer-type or layered-type photosensitive layer. A preferred example is a layered-type electrophotographic photoreceptor the photosensitive layer of which contains at least one charge generation layer and at least one charge transport layer containing the polycarbonate as a binder resin.

In the electrophotographic photoreceptor of the present invention, the polycarbonates of the present invention may be used individually or in a combination of two or more of them. According to demand, other resins, such as other polycarbonates, may be added so far as the object of the present invention is attained. Additives, such as antioxidants, may also be added.

The electroconductive substrate to be used in the present invention may be of various materials, including known ones, and some examples include plates, drums and sheets of metals, such as aluminum, brass, copper, nickel and steel, plastic sheets rendered with electroconductivity by evaporating, spattering or applying thereon an electroconductive material, such as aluminum, nickel, chromium, palladium or graphite, metal drums the surfaces of which are oxidized, for example, by electrode oxidation, and plates of glass, plastic, cloth and paper, which are rendered with electroconductivity by the means as described above.

The charge generation layer of the layered-type electroconductive photoreceptor contains at least a charge generating material and is formed, for example, by vacuum-evaporating or spattering the charge generating material on the surface of a predetermined base layer or by binding the charge generating material to the predetermined base layer with a binder resin. As to the method of forming the charge generation layer by using a binder resin, various methods including known ones may be employed, and, in general, it is preferable to coat a predetermined base layer with a coating liquid which is prepared by dispersing or dissolving a charge generating material in an appropriate solvent together with a binder resin and then drying the coating.

The charge generating material to be used in the present invention may be selected from various ones including known ones, and typical examples include various inorganic materials, for example, simple substances of selenium, such as non-crystalline selenium and crystalline selenium of a trigonal system, selenium-based alloy, such as selenium-tellurium alloys, selenides, such as $As_2Se_3$, selenium-containing compositions, zinc oxide, inorganic materials comprising elements of the Group II and elements of the Group IV in the periodic table, such as CdS-Se, oxide semiconductors, such as titanium oxide, and silicon-based materials, such as amorphous silicon, and various organic materials, for example, phthalocyanines, metal complexes of phthalocyanines, cyanin, anthracene, bisazo compounds, pyrene, perylene, pyrylium salts, thiapyrylium salts, polyvinyl carbazole and squarelium pigments.

These charge generating materials may be used individually or in a combination of two or more of them, for example, as a mixture.

The binder resin which may be used in the charge generation layer is not particularly limited, and various ones, including known ones, may be used. Typical examples include thermoplastic resins, such as polystyrene, polyvinyl chloride, polyvlnyl acetate, vinyl chloride-vinyl acetate copolymers, polyvinyl acetal, alkyd resins, acrylic resins, polyacrylonitrile, polycarbonates, polyamides, polyketones, polyacrylamides, butyral resins and polyesters, and thermosetting resins, such as polyurethanes, epoxy resins and phenolic resins.

The polycarbonate of the present invention also may be used as the binder resin in the charge generation layer.

The charge transport layer may be formed by binding a charge transporting material to a predetermined base layer by using a binder resin.

As to the method of forming the charge transport layer, various methods including known ones may be employed, and, in general, it is preferable to coat a predetermined base layer with a coating liquid which is prepared by dispersing or dissolving a charge transporting material in an appropriate solvent together with the polycarbonate of the present invention, and drying the coating.

In the charge transport layer, the polycarbonates of the present invention may be used individually or in a form of a mixture of two or more of them. Other resins also may be used together with the polycarbonate of the present invention so far as the object of the present invention can be attained.

Examples of the charge transporting materials which may be used in the present invention include electron transporting materials and positive hole transporting materials, which have been conventionally used.

Some examples of the electron transporting materials include electron withdrawing compounds, for example, chloranil, bromanil, 2,3-dichloro-5,6-dicyano-p-benzoquinone, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,9-trinitrothioxanthone, diphenoquinone derivatives, such as 3,5-dimethyl-3' ,5'-di-t-butyl-4,4'-diphenoquinone, and polymers prepared therefrom. These electron withdrawing compounds may be used individually or in a combination of two or more of them, for example in a form of a mixture thereof.

Some examples of the positive hole transporting materials include pyrene, N-ethylcarbazole, N-isopropylcarbazole, hydrazones, such as N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, p-diethylaminobenzaldehyde-N,N-diphenylhydrazone, p-diethylaminobenzaldehyde-N-α-naphthyl-N-phenylhydrazone, p-pyrrolidinobenzaldehyde-N,N-diphenylhydrazone, 1,3,3-trimethylindolenine-ω-aldehyde-N,N-diphenylhydrazone, p-diethylbenzaldehyde-3-methylbenzothiazolinone-2-hydrazone and 1-phenyl-1,2,3,4-tetrahydroquinoline-6-carboxyaldehyde- 1',1'-diphenylhydrazone, 2,5-bis(p-diethylaminophenyl)-1,3,4-oxadiazole, pyrazolines, such as 1-phenyl-3-(p-diethylaminostyryl)-5 -(p-diethylaminophenyl)pyrazoline, 1-[quinolyl(2)]-3-(p-diethylaminostyryl)-5-(p-diethylaminophenyl)pyrazoline, 1-[lepidyl(2)]-3-(p-diethylaminostyryl)-5-(p-diethylaminophenyl)pyrazoline, 1-[6-methoxy-pyridyl(2)]-3-(p-diethylaminostyryl)-5-(p-diethylaminophenyl)pyrazoline, 1-[pyridyl(5)]-3-(p-diethylaminophenyl)pyrazoline, 1-[pyridyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α -benzyl-p-diethylaminostyryl)-5-(p-diethylaminophenyl)pyrazoline and spiropyrazoline, oxazole compounds, such as 2-(p-diethylaminostyryl)-δ-diethylaminobenzoxazole and 2-(p-diethylaminophenyl)-4-(p-dimethylaminophenyl)-5-(2 -chlorophenyl)oxazole, thiazole compounds, such as 2-(p-diethylaminostyryl)-6-diethylaminobenzothiazole, triarylmethane compounds, such as bis(4-diethylamino-2-methylphenyl)-phenylmethane, polyarylamines, such as 1,1-bis(4-N,N-diethylamino-2-methylphenyl)heptane and 1,1,2,2-tetrakis(4-N,N-dimethylamino-2-methylphenyl)ethane, benzidine compounds, such as N,N'-diphenyl-N,N'-bis(methylphenyl)benzidine, N,N'-diphenyl-N,N'-bis(ethylphenyl)benzidine, N,N'-diphenyl-N,N'-bis(propylphenyl)benzidine, N,N'-diphenyl-N,N'-bis(butylphenyl)benzidine, N,N'-diphenyl-N,N'-bis(isopropylphenyl)benzidine, N,N'-diphenyl-N,N'-bis(t-butylphenyl)benzidine, N,N'-diphenyl-N,N'-bis(t-butylphenyl)benzidine and N,N'-diphenyl-N,N'-bis(chlorophenyl)benzidine, butadiene compounds, triphenylamine, poly-N-vinylcarbazole, polyvinylpyrene, polyvinylanthracene, polyvinylacrydine, poly-9-vinylphenylanthracene, organic polysilanes, pyrene-formaldehyde resins and ethylcarbazole-formaldehyde resins.

These positive hole transporting materials may be used individually or in a combination of two or more of them, for example in a form of a mixture thereof.

Some examples of the solvent to be used to form the charge generation layer or the charge transport layer include aromatic solvents, such as benzene, toluene, xylene and chlorobenzene, ketones, such as acetone, methyl ethyl ketone and cyclohexanone, alcohols, such as methanol, ethanol and isopropanol, esters, such as ethyl acetate and ethylcellosolve, halogenized hydrocarbons, such as carbon tetrachloride, chloroform, dichloromethane and tetrachloroethane, ethers, such as tetrahydrofuran and dioxane, dimethylformamide, dimethylsulfoxide and diethylformamide.

These solvents may be used individually or in a combination of two or more of them, for example in a form of a solvent mixture thereof.

Coating of the above-described layers may be carried out by using various coating apparatuses including known ones, such as an applicator, a spray coater, a bar coater, a role coater, a dip coater and a doctor blade.

The photosensitive layer of the single-layer-type electrophotographic photoreceptor contains at least the polycarbonate of the present invention, the charge generating material and the charge transporting material. As to the method of forming the photosensitive layer, various methods including known ones may be employed, and, in general, it is preferable to coat a predetermined base layer with a coating liquid which is prepared by dispersing or dissolving a charge generating material and a charge transporting material in an appropriate solvent together with the resin, and drying the coating.

Other resins also may be used together with the polycarbonate of the present invention so far as the object of the present invention can be attained.

The electrophotographic photoreceptor of the present invention is a practically advantageous electrophotographic photoreceptor which is free from the coating liquid's getting cloudy (gelation) at the time of production and maintains high mechanical strength and excellent electrophotographic properties even after repeated uses for a long term, and the electrophotographic photoreceptor is suitably applicable in various fields of electrophotography.

The present invention will be described in more detail with reference to the following Examples and Comparative Examples. These Examples, however, are not to be construed to limit the scope of the invention, and the invention may be modified in various manners within the scope of the present invention.

EXAMPLE 1

To a reaction vessel equipped with baffle plates were placed 68.6 g (0.256 moles) of 1,1-bis(4-hydroxyphenyl)cyclohexane, 550 ml of a 8 wt % aqueous sodium hydroxide solution, 400 ml of methylene chloride, 0.8 g of p-(perfluoro-n-nonyl)phenol as an end terminator and 3 ml of a 10 wt % aqueous triethylamine solution. While the reaction mixture was kept to temperatures in the vicinity of 10° C. and stirred vigorously, 340 ml/min of phosgene gas was bubbled for 30 minutes therein.

After the conclusion of the reaction, the organic phase of the reaction mixture was diluted with one litter of methylene chloride, was washed sequentially with water, diluted hydrochloric acid and water and was then poured in methanol, to obtain 75 g of a polycarbonate.

The polycarbonate thus obtained had a reduced viscosity $[\eta_{sp}/c]$ of 0.82 dl/g, measured as a 0.5 g/dl solution dissolved in methylene chloride at 20° C. An $^1$H-NMR spectrum indicated peaks at 7.25 ppm and 7.45 ppm due to the hydrogen atoms on the phenyls at the ends of polymer chains, wherefore the polycarbonate was confirmed to have the following structure.

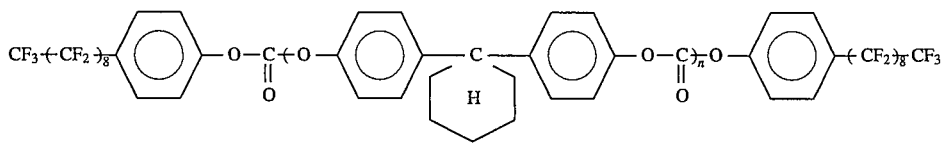

EXAMPLE 2

The procedure of Example 1 was repeated with the exception that 58.4 g of 2,2-bis(4-hydroxyphenyl)propane as a monomer material and 1.0 g of perfluoro-n-dodecyl p-hydroxybenzoate as an end terminator were used. From the results of $^1$H-NMR spectrum analysis, the resulting product was confirmed to be a polycarbonate having the following structure. ($[\eta_{sp}/c]$=0.78 dl/g, Yield: 64 g)

EXAMPLE 5

The procedure of Example 1 was repeated with the exception that 45.6 g of 2,2-bis(4-hydroxyphenyl)propane and 10.4 g of 4,4'-dihydroxybiphenyl as monomer materials and 1.0 g of p-(perfluoro-tert-butyl)phenol as an end terminator were used. From the results of $^1$H-NMR spectrum analysis, the resulting product was confirmed to be a poly-

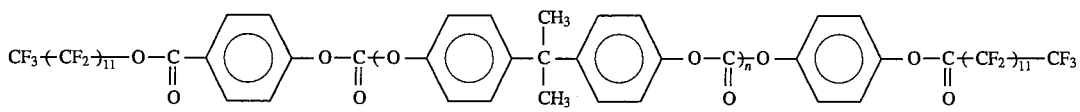

EXAMPLE 3

The procedure of Example 1 was repeated with the exception that 65.5 g of 2,2-bis(3-methyl-4-hydroxyphenyl)propane as a monomer material and 0.9 g of p-(perfluoro-n-hexyloxy)phenol as an end terminator were used. From the results of $^1$H-NMR spectrum analysis, the resulting product was confirmed to be a polycarbonate having the following structure. ($[\eta_{sp}/c]$=0.91 dl/g, Yield: 70 g)

carbonate having the following structure. ($[\eta_{sp}/c]$=0.94 dl/g, Yield: 61 g)

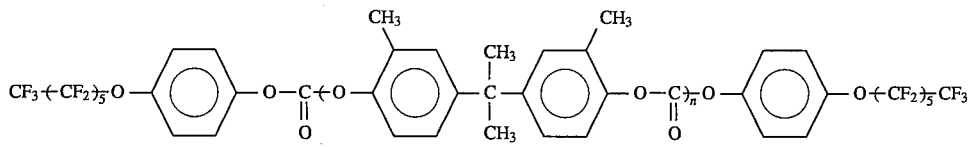

EXAMPLE 4

The procedure of Example 1 was repeated with the exception that 90.1 g of 1,1-bis(4-hydroxyphenyl)-1,1-diphenylmethane as a monomer material and 0.9 g of 1-(p-hydroxybenzyl)perfluoro-n-decane as an end terminator were used. From the results of $^1$H-NMR spectrum analysis, the resulting product was confirmed to be a polycarbonate having the following structure. ($[\eta_{sp}/c]$=0.87 dl/g, Yield: 95 g)

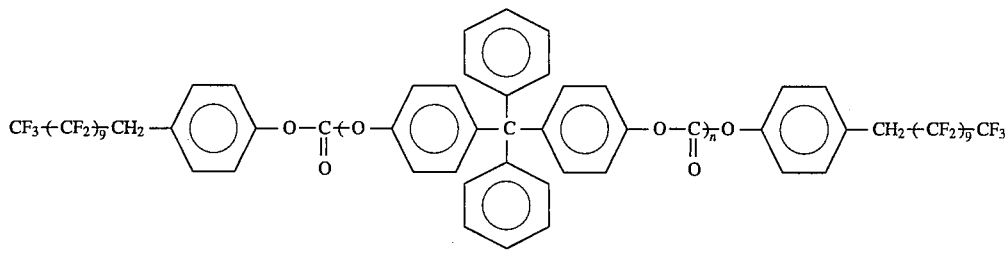

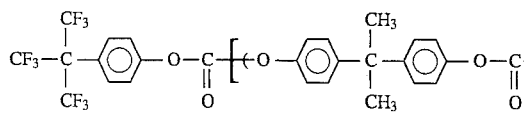

EXAMPLE 6

By using a hydrazone compound having the following structure, a solution of the hydrazone compound: the polycarbonate as prepared in Example 1: tetrahydrofuran (solvent)=1:1:18 (weight ratio) was prepared to use the solution as a coating liquid. One month of standing did not make the coating liquid get cloudy or gel. On a charge generation layer of about 0.5 μm which was a layer of oxotitanium phthalocyanine formed on a conductive substrate made of aluminum was formed a charge transport layer of 20 μm by coating the charge generation layer with the coating liquid by a dip-coating technique and drying, to produce a layered-type electrophotographic photoreceptor. During the coating, crystallization did not occur in the charge transport layer.

charge transporting material (1-phenyl-1,2,3,4 -tetrahydydroquinoline-6-carboxyaldehyde-1',1'-diphenylhydrazone)

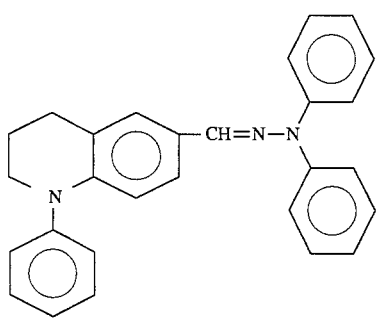

The electrophotographic properties of the obtained electrophotographic photoreceptor were evaluated by carrying out a corona discharge of −6 kV and measuring initial surface voltage ($V_o$), residual voltage ($V_R$) after light irradiation (10 Lux) and half-life exposure ($E_{1/2}$) by using an apparatus for testing static electricity charging (EPA-8100, trade name, produced by Kabushiki Kaisha Kawaguchi Denki Seisakusho). The results are listed in Table 1.

The abrasion resistance of the charge transport layer was evaluated by using a Suga Abrader (Trade name, produced by Suga Shikenki Kabushiki Kaisha). The evaluation was carried out by measuring the abrasion loss of a sample which was put into reciprocating motion 1200 times on an abrasion paper which was given a load of 200 g. The result is shown in Table 2.

EXAMPLE 7

A layered-type electrophotographic photoreceptor was produced in the same manner as in Example 6 with the exception that the polycarbonate obtained in Example 2 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 8

A layered-type electrophotographic photoreceptor was produced in the same manner as in Example 6 with the exception that the polycarbonate obtained in Example 3 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 9

A layered-type electrophotographic photoreceptor was produced in the same manner as in Example 6 with the exception that the polycarbonate obtained in Example 4 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 10

A layered-type electrophotographic photoreceptor was produced in the same manner as in Example 6 with the exception that the polycarbonate obtained in Example 5 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 11

The procedure of Example 1 was repeated with the exception that 68.6 g of 1,1-bis(4-hydroxyphenyl)cyclohexane as a monomer material and 0.8 g of p-1H,1H-perfluorooctyloxyphenol as an end terminator were used. From the results of $^1$H-NMR spectrum analysis, the resulting product was confirmed to be a polycarbonate having the following structure. ([$\eta_{sp}$/c]=0.79 dl/g, Yield: 64.5 g)

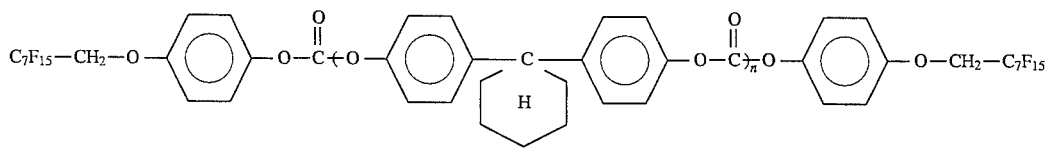

EXAMPLE 12

The procedure of Example 1 was repeated with the exception that 45.6 g of 2,2-bis(4-hydroxyphenyl)propane and 10.4 g of 4,4'-dihydroxybiphenyl as monomer materials and 3.0 g of p-(2-1H,1H-perfluorotridecyloxy-1,1,1,3,3,3- hexafluoro-2-propyl)phenol as an end terminator were used. From the results of $^1$H-NMR spectrum analysis, the resulting product was confirmed to be a polycarbonate having the following structure. ($[\eta_{sp}/c]$=0.92 dl/g, Yield: 62 g)

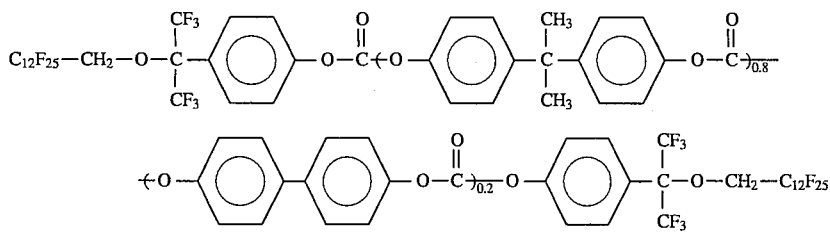

EXAMPLE 13

The procedure of Example 1 was repeated with the exception that 58.4 g of 2,2-bis(4-hydroxyphenyl)propane as a monomer material and 2.8 g of 3,5-bis(perfluorohexyloxycarbonyl)phenol as an end terminator were used. From the results of $^1$H-NMR spectrum analysis, the resulting product was confirmed to be a polycarbonate having the following structure. ($[\eta_{sp}/c]$=0.85 dl/g, Yield: 72.5 g)

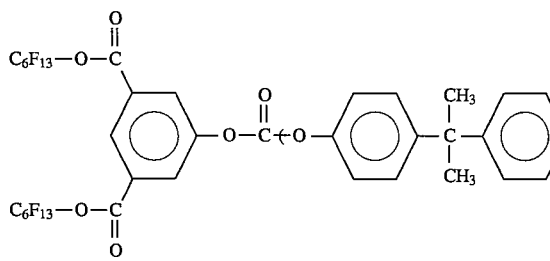

EXAMPLE 14

A layered-type electrophotographic photoreceptor was produced in the same manner as in Example 6 with the exception that the polycarbonate obtained in Example 11 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 15

A layered-type electrophotographic photoreceptor was produced in the same manner as in Example 6 with the exception that the polycarbonate obtained in Example 12 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 16

A layered-type electrophotographic photoreceptor was produced in the same manner as in Example 6 with the exception that the polycarbonate obtained in Example 13 was used. The evaluation result of the stability of the prepared coating liquid and the evaluation result of crystallization during coating were the same as those in Example 6. The results of evaluations of electrophotographic properties and abrasion resistance are listed in Table 1 and Table 2.

EXAMPLE 17

In a reactor equipped with baffle plates were placed 68.6 g (0.256 mol) of 1,1-bis(4-hydroxyphenyl)cyclohexane as a monomer material, 550 ml of a 8 wt % aqueous sodium hydroxide solution, 400 ml of methylene chloride, 1.0 g of p-1H, 1H-perfluorooctyloxyphenol as an end terminator, 0.5 g of 1,1,1-tris(4-hydroxyphenyl)ethane as a branching monomer and 3 ml of 10 wt % aqueous triethylamine

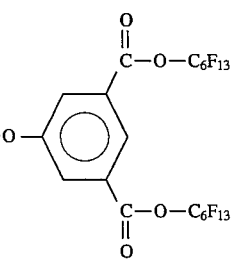

solution as a catalyst. While the reaction mixture was kept to temperatures in the vicinity of 10° C. and stirred vigorously, 340 ml/min of phosgene gas was bubbled for 30 minutes therein.

After the conclusion of the reaction, the organic phase of the reaction mixture was diluted with one liter of methylene chloride, was washed sequentially with water, diluted hydrochloric acid and water and was then poured in methanol, to obtain 75 g of a polycarbonate.

The polycarbonate thus obtained had a reduced viscosity $[\eta_{sp}/c]$ of 1.21 dl/g, measured as a 0.5 g/dl solution dissolved in methylene chloride at 20° C. From the results of $^1$H-NMR spectrum analysis, the resulting product was confirmed to be a branched polycarbonate having the following structure.

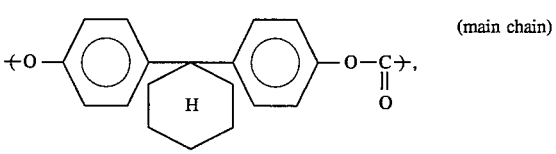

(main chain)

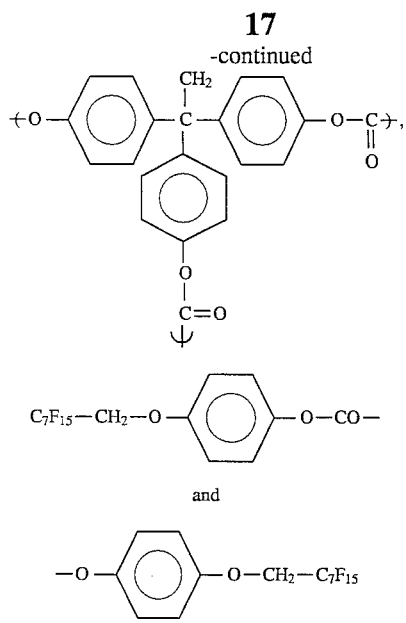

(branch)

$C_7F_{15}-CH_2-O-\phantom{}\bigcirc\phantom{}-O-CO-$ and $-O-\phantom{}\bigcirc\phantom{}-O-CH_2-C_7F_{15}$ (end group)

(end group)

COMPARATIVE EXAMPLE 1

A layered-type electrophotographic photoreceptor was produced in the same manner as in Example 6 with the exception that a commercial polycarbonate ($[\eta_{sp}/c]=0.78$ dl/g) prepared from 2,2-bis-(4-hydroxyphenyl)propane (bisphenol-A) (end terminator: p-tert-butylphenol) was used. The prepared coating liquid got cloudy and gelled two days after. During coating, a part of the charge transport layer crystallized (got cloudy). The results of evaluations of electrophotographic properties and abrasion resistance are listed in Table 1 and Table 2.

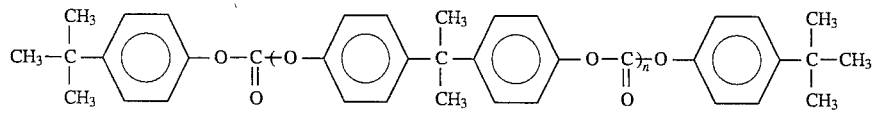

TABLE 1

| | Electrophotographic Properties | | |
|---|---|---|---|
| | Initial surface voltage $V_O$ (V) | Residual voltage $V_R$ (V) | Half-life exposure $E_{1/2}$ (Lux · sec) |
| Example 6 | −750 | −1 | 0.78 |
| Example 7 | −742 | −2 | 0.81 |
| Example 8 | −768 | −2 | 0.79 |
| Example 9 | −752 | −3 | 0.81 |
| Example 10 | −755 | −2 | 0.78 |
| Example 14 | −750 | −1 | 0.78 |
| Example 15 | −742 | −2 | 0.70 |
| Example 16 | −752 | −3 | 0.81 |
| Comparative example 1 | −752 | −3 | 0.84 |

TABLE 2

| | Abrasion Resistance |
|---|---|
| | Abrasion loss (mg) |
| Example 6 | 1.66 |
| Example 7 | 1.88 |
| Example 8 | 1.68 |
| Example 9 | 1.70 |
| Example 10 | 1.58 |
| Example 14 | 1.66 |
| Example 15 | 1.52 |
| Example 16 | 1.86 |
| Comparative example 1 | 2.36 |

According to the present invention, there can be provided a polycarbonate which has a novel chemical structure and excellent properties, and there also can be provided an electrophotographic photoreceptor the photosensitive layer of which contains the polycarbonate of the specific structure as a component. Since the photosensitive layer is formed by using a coating liquid which contains the polycarbonate and does not get cloudy (gel), the electrophotographic photoreceptor has such a high plate wear as to ensure a long life and maintains good electrophotographic properties over a long period due to the improved surface hardness, namely the improved abrasion resistance of its surface.

We claim:

1. An electrophotographic photoreceptor comprising an electroconductive substrate and a photosensitive layer disposed on a surface of the electroconductive substrate, the photosensitive layer containing a polycarbonate comprising a repeating unit represented by the following general formula

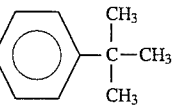

(I)

wherein each of $R^1$ and $R^2$, respectively, is a halogen atom, an alkyl group of 1 to 6 carbon atoms, a cycloalkyl group of 5 to 7 carbon atoms or a phenyl group, each of a and b, respectively, is an integer of 0 to 4, and X is a single bond, —O—, —CO—, —S—, —SO—, —SO$_2$—, —CR$^3$R$^4$—, a 1,1, cycloalkylidene group of 5 to 11 carbon atoms or an α, ω-alkylene group of 2 to 12 carbon atoms, each of $R^3$ and $R^4$ respectively being hydrogen atom, trifluoromethyl group, an alkyl group of 1 to 6 carbon atoms or a phenyl group, and end groups selected from the group consisting of the combinations of $C_6F_{13}$— and $C_6F_{13}$—CO—,
$C_7F_{15}$— and $C_7F_{15}$—CO—,
$C_8F_{17}$— and $C_8F_{17}$—CO—,
$C_7F_{15}CH_2$— and $C_7F_{15}CH_2$—CO—,
$C_9F_{19}$— and $C_9F_{19}$—CO—,
$C_7F_{15}$—$CH_2CH_2$— and $C_7F_{15}$—$CH_2CH_2$—CO—, $C_{10}F_{21}$— and $C_{10}F_{21}$—CO—,
$C_{11}F_{23}$— and $C_{11}F_{23}$—CO—,
$C_{12}F_{25}$— and $C_{12}F_{25}$—CO—,
$C_{13}F_{27}$— and $C_{13}F_{27}$—CO—,
$C_{14}F_{29}$— and $C_{14}F_{29}$—CO—,
$C_{15}F_{31}$— and $C_{15}F_{31}$—CO—,
$C_{17}F_{35}$— and $C_{17}F_{35}$—CO—,
H—$(CF_2)_7$—$CH_2$— and H—$(CF_2)_7$—$CH_2$—CO—,

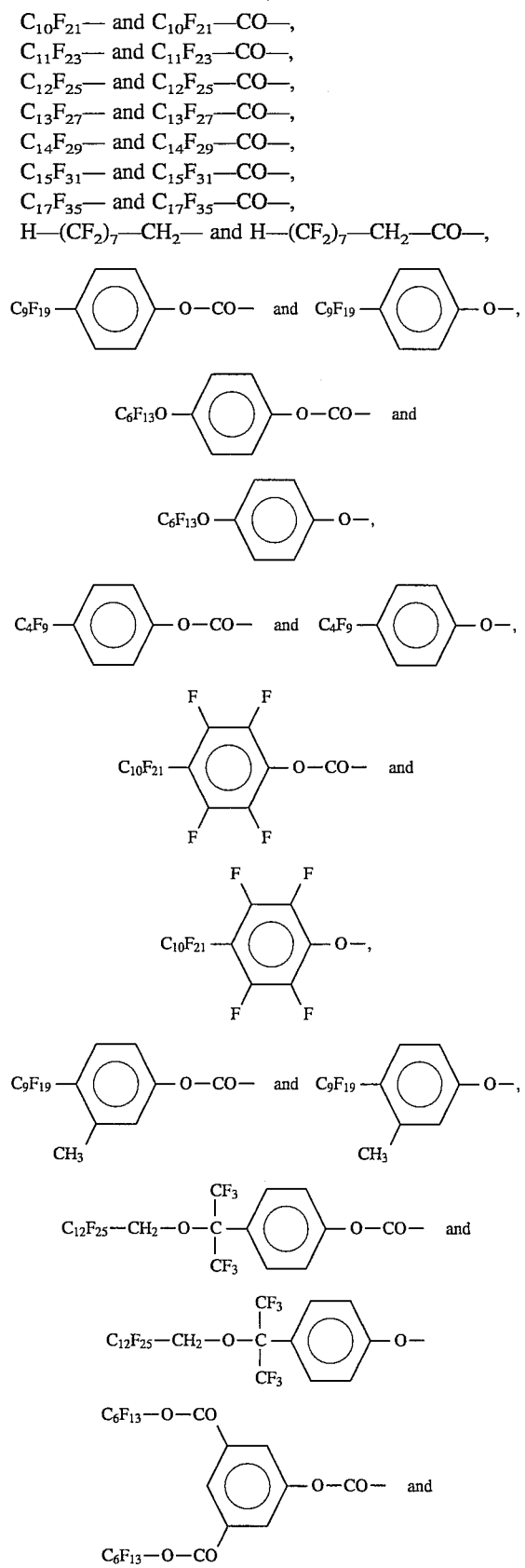

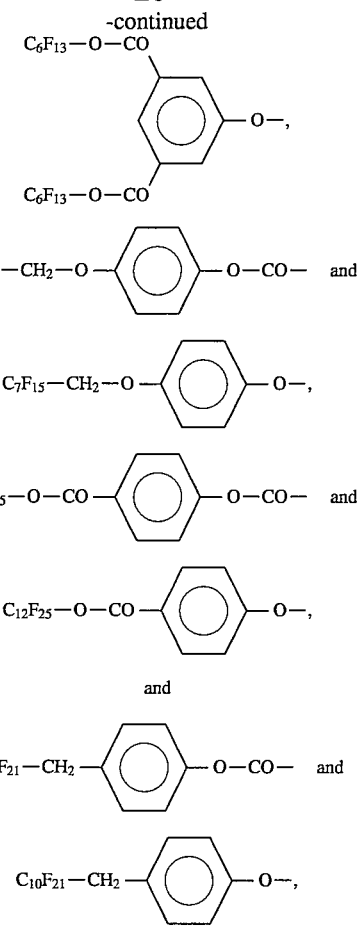

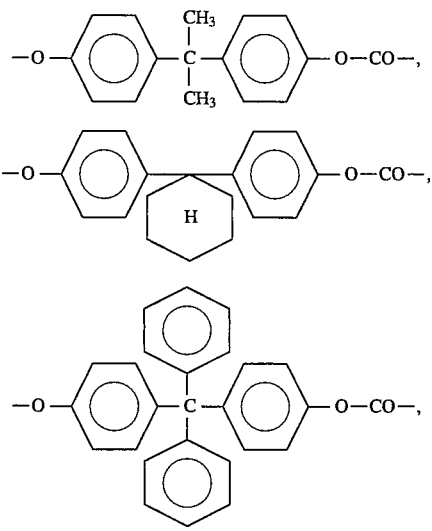

said polycarbonate having a reduced viscosity of 0.1 to 2.5 dl/g, measured at 20° C. as a solution of a concentration of 0.5 g/dl in methylene chloride.

2. The electrophotographic photoreceptor of claim 1, wherein the repeating unit represented by the general formula (I) is selected from the group consisting of -continued
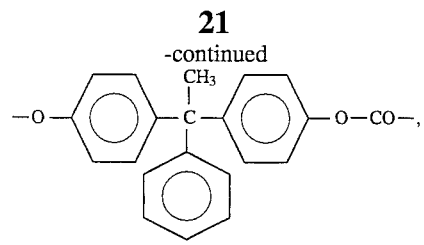
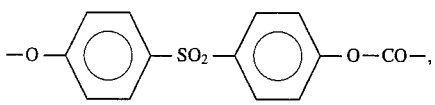
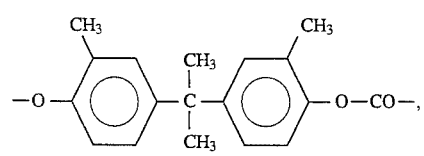
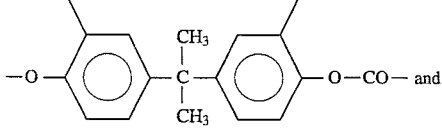
and the end groups are selected from the group consisting of the combinations of
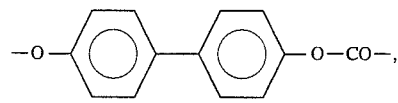
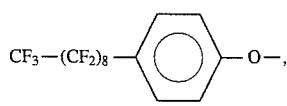
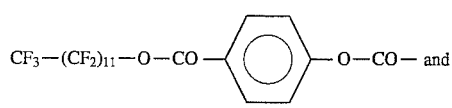
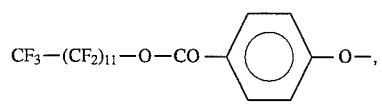
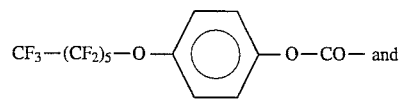
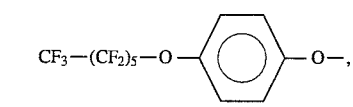
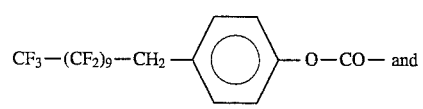
-continued
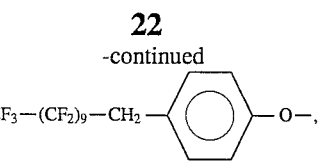
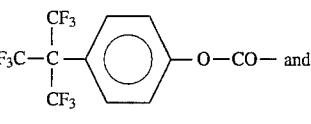
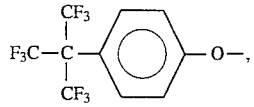
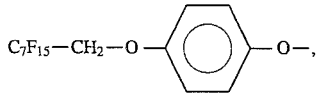
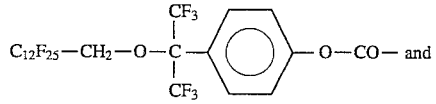
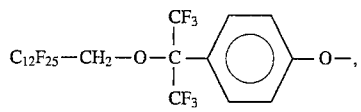
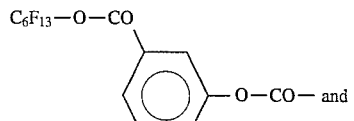
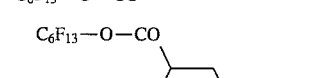
$H-(CF_2)_7-CH_2-$ and $H-(CF_2)_7-CH_2-CO-$.
3. The electrophotographic photoreceptor of claim 2, wherein the polycarbonate is selected from the group consisting of
a polycarbonate wherein the repeating unit represented by the general formula (I) is
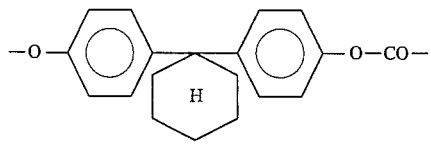
and the end groups are
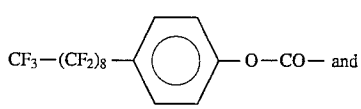

-continued

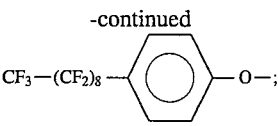

a polycarbonate wherein the repeating unit represented by the general formula (I) is

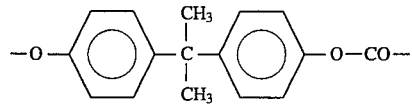

and the end groups are

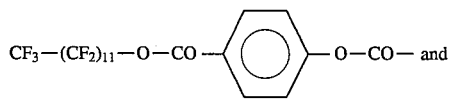

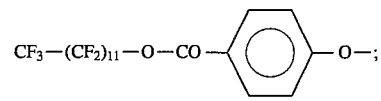

a polycarbonate wherein the repeating unit represented by the general formula (I) is

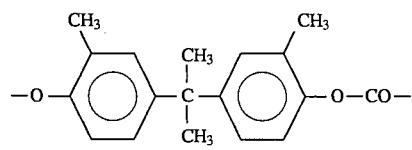

and the end groups are

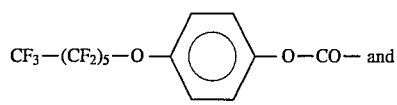

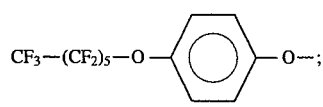

a polycarbonate wherein the repeating unit represented by the general formula (I) is

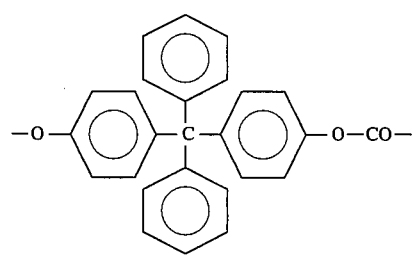

and the end groups are

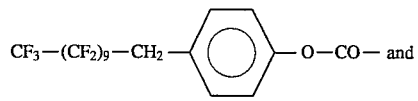

-continued

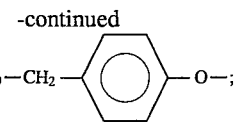

a polycarbonate wherein the repeating units represented by the general formula (I) are

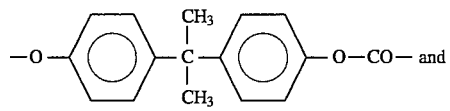

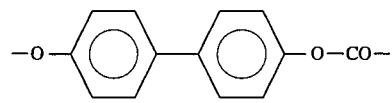

and the end groups are

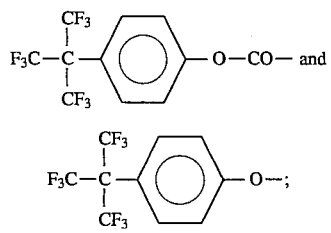

a polycarbonate wherein the repeating unit represented by the general formula (I) is

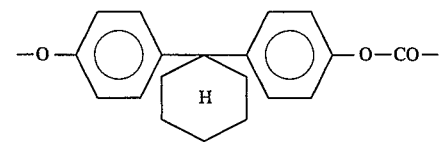

and the end groups are

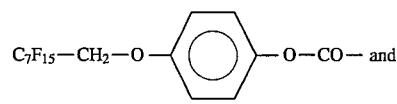

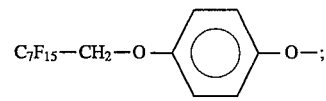

a polycarbonate wherein the repeating units represented by the general formula (I) are

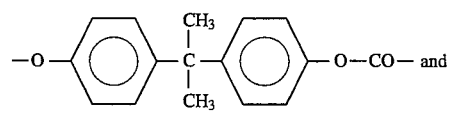

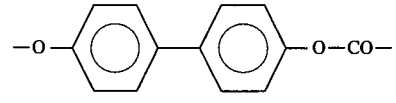

and the end groups are

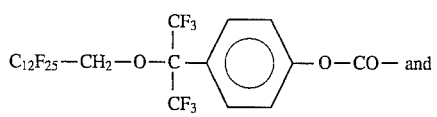

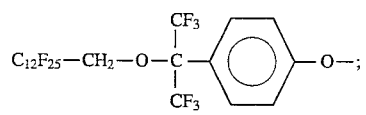

a polycarbonate wherein the repeating unit represented by the general formula (I) is

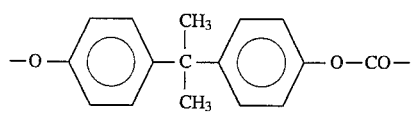

and the end groups are

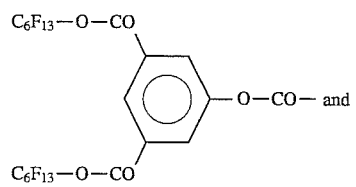

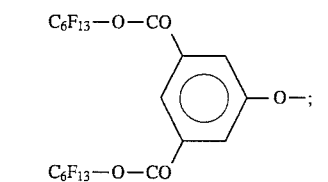

and a polycarbonate wherein the repeating unit represented by the general formula (I) is

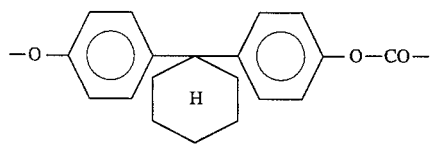

and the end groups are

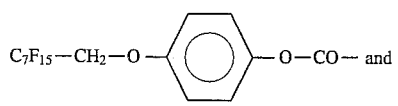

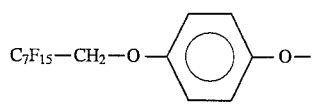

and which further contains a branching unit represented by the following formula

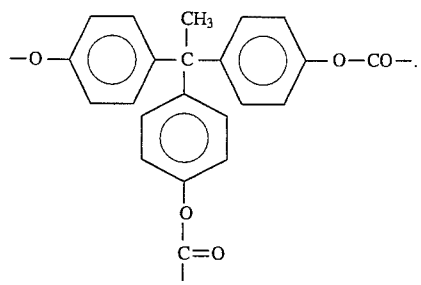

4. The electrophotographic photoreceptor of claim 1, wherein the photosensitive layer comprises a charge generation layer, which comprises a charge generating material, and a charge transport layer, which comprises a charge transporting material and a binder resin and, the charge generation layer being disposed between the electroconductive substrate and the charge transport layer, and the polycarbonate is used as the binder resin.

5. The electrophotographic photoreceptor of claim 4, wherein the repeating unit represented by the general formula (I) is selected from the group consisting of

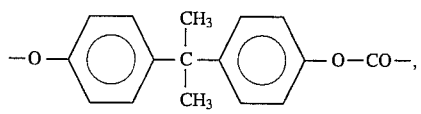

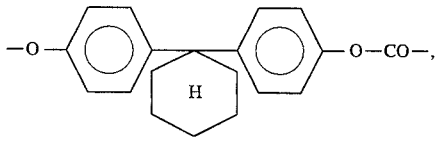

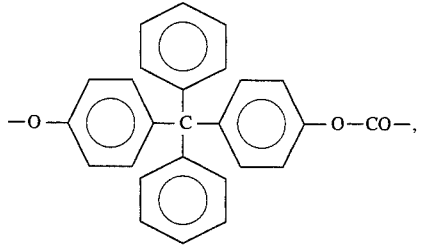

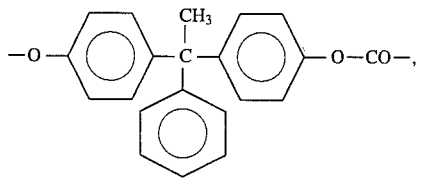

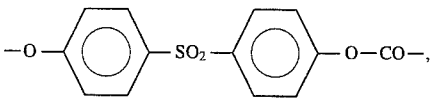

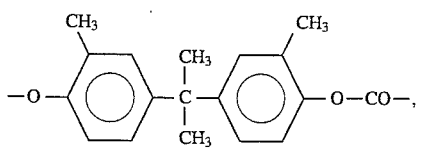

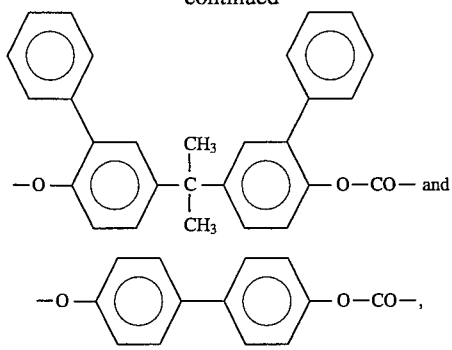

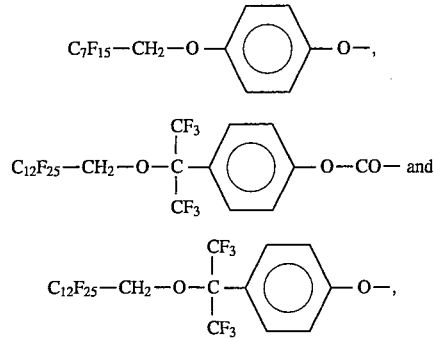

and the end groups are selected from the group consisting of the combinations of

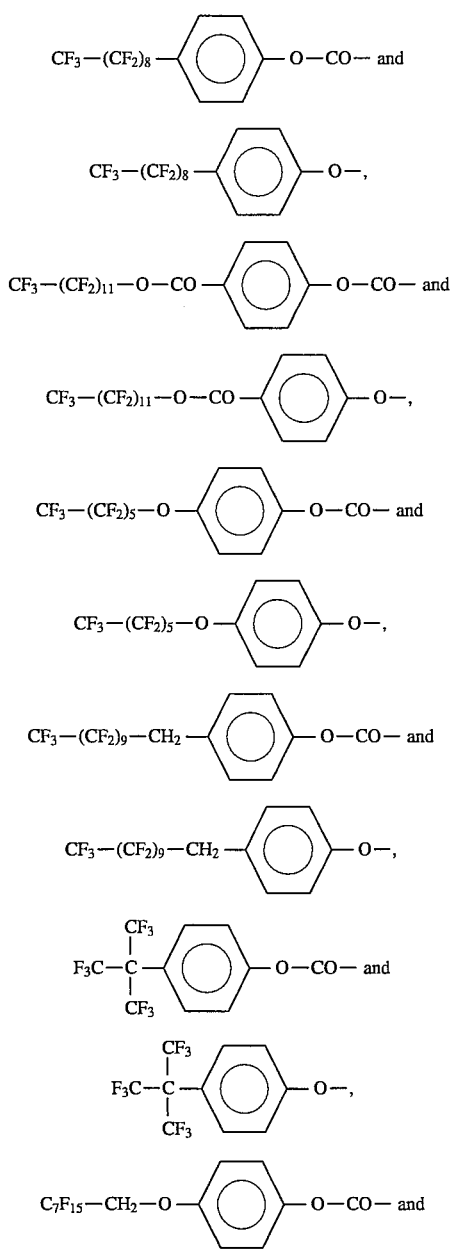

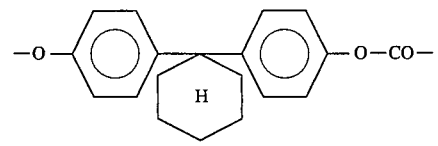

$H-(CF_2)_7-CH_2-$ and $H-(CF_2)_7-CH_2-CO-$.

6. The electrophotographic photoreceptor of claim 5, wherein the polycarbonate is selected from the group consisting of a polycarbonate wherein the repeating unit represented by the general formula (I) is

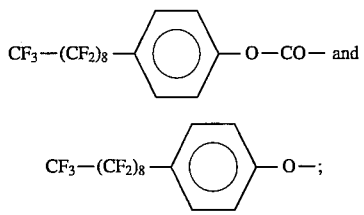

and the end groups are

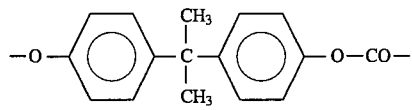

a polycarbonate wherein the repeating unit represented by the general formula (I) is

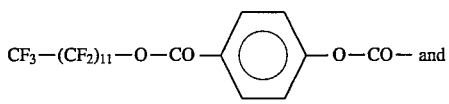

and the end groups are $CF_3-(CF_2)_{11}-O-CO$—⟨⟩—$O-CO-$ and

-continued

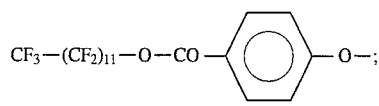

a polycarbonate wherein the repeating unit represented by the general formula (I) is

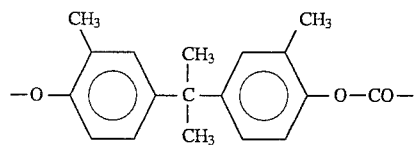

and the end groups are

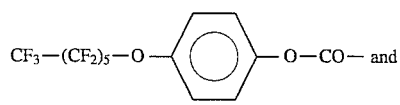

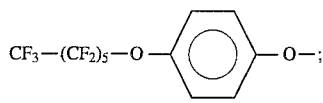

a polycarbonate wherein the repeating unit represented by the general formula (I) is

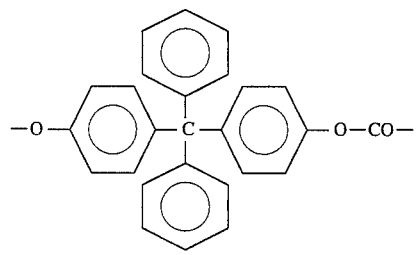

and the end groups are

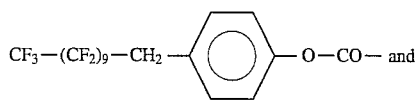

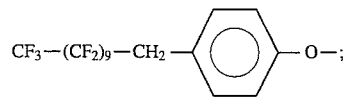

a polycarbonate wherein the repeating units represented by the general formula (I) are

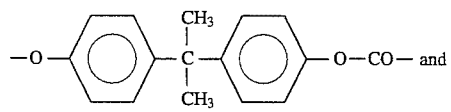

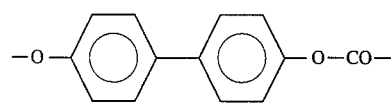

and the end groups are

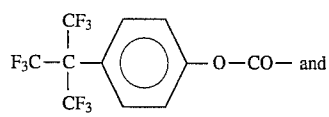

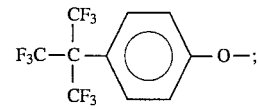

a polycarbonate wherein the repeating unit represented by the general formula (I) is

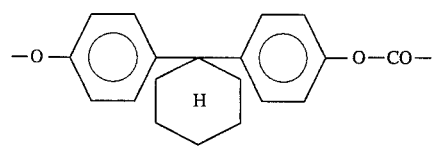

and the end groups are

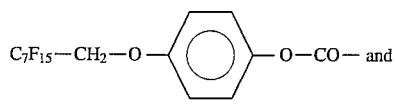

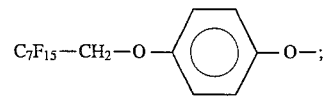

a polycarbonate wherein the repeating units represented by the general formula (I) are

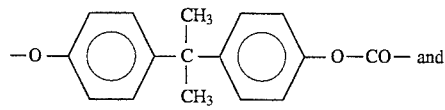

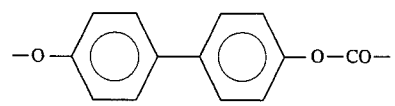

and the end groups are

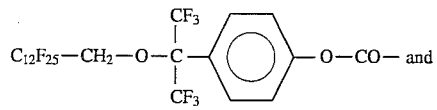

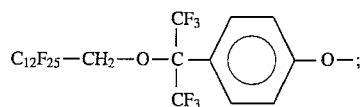

a polycarbonate wherein the repeating unit represented by the general formula (I) is

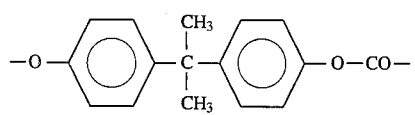

and the end groups are

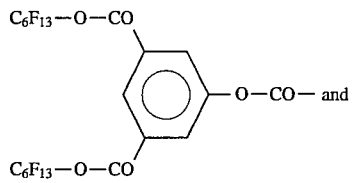

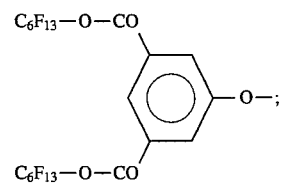

and a polycarbonate wherein the repeating unit represented by the general formula (I) is

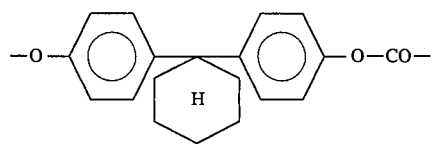

and the end groups are

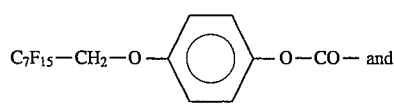

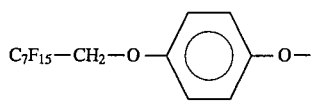

and which further contains a branching unit represented by the following formula

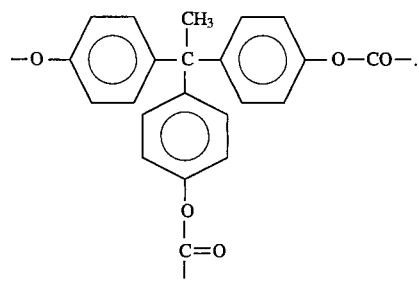

7. The electrophotographic photoreceptor of claim 6, wherein the electroconductive substrate is a layer of aluminum, the charge generation layer is a layer of oxotitanium phthalocyanine, and the charge transporting material is 1-phenyl-1,2,3,4-tetrahydroquinoline-6-carboxyaldehyde-1',1'-diphenylhydrazone.

8. The electrophotographic photoreceptor of claim 1, wherein the end groups are selected from the group consisting of the combinations of

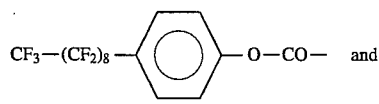

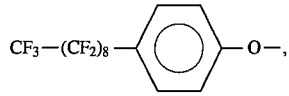

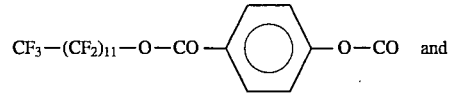

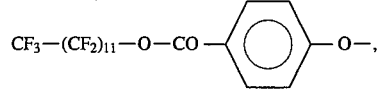

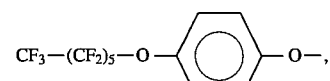

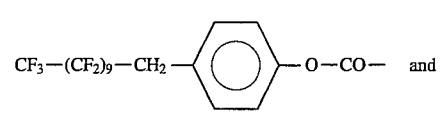

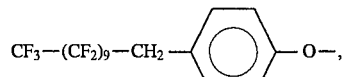

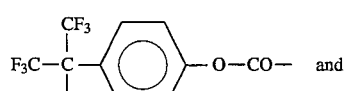

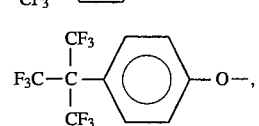

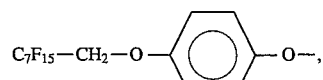

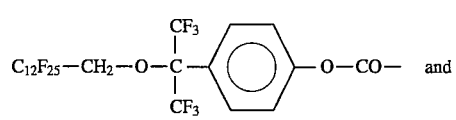

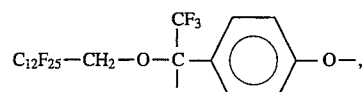

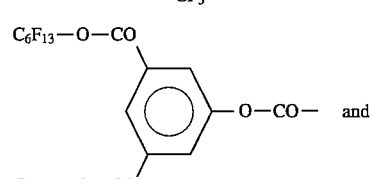

33
-continued
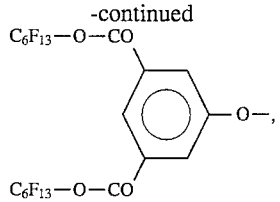
34
-continued
and
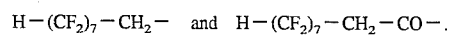
* * * * *